United States Patent [19]

Nakagawa

[11] Patent Number: 4,701,897
[45] Date of Patent: Oct. 20, 1987

[54] OPTICAL DISK APPARATUS
[75] Inventor: Akira Nakagawa, Kawasaki, Japan
[73] Assignee: Kabushiki Kaisha Toshiba, Kawasaki, Japan
[21] Appl. No.: 625,793
[22] Filed: Jun. 28, 1984
[30] Foreign Application Priority Data
Jun. 30, 1983 [JP] Japan .................. 58-119332
[51] Int. Cl.⁴ .............. G11B 27/10; G11B 7/095
[52] U.S. Cl. .................. 369/32; 358/907; 369/44; 369/33; 369/43
[58] Field of Search .......... 358/907; 369/44, 46, 369/32, 30, 33, 43, 111, 45; 360/72.2

[56] References Cited
U.S. PATENT DOCUMENTS

| | | | |
|---|---|---|---|
| 4,375,091 | 2/1983 | Dakin | 369/32 |
| 4,432,083 | 2/1984 | Hsieh | 369/32 |
| 4,484,319 | 11/1984 | Koishi | 369/32 |
| 4,536,863 | 8/1985 | Giddings | 369/32 |
| 4,572,965 | 2/1986 | Yamamura | 369/124 |
| 4,623,993 | 11/1986 | Schlosser | 369/44 |

Primary Examiner—Alan Faber
Attorney, Agent, or Firm—Cushman, Darby & Cushman

[57] ABSTRACT

An optical disk apparatus has an optical head for photoelectrically detecting track data and a track jump data component corresponding to an accidental track jump on an optical disk. A circuit is provided wherein the track jump data component is detected from the data detected by the optical head so as to determine the number of jumped tracks and a jump direction therefrom. A tracking section performs tracking control of the optical head in accordance with a signal corresponding to jump direction and the number of the jumped tracks and returns a laser beam to the track at which the laser beam was directed before the track jump.

6 Claims, 5 Drawing Figures

OPTICAL DISK APPARATUS

BACKGROUND OF THE INVENTION

The present invention relates to an optical disk apparatus and, more particularly, to an optical disk apparatus for performing tracking by detecting prepits or a pregroove or pregrooves.

An optical disk apparatus can record data at high density and is widely used for recording a large amount of data such as image data. An optical disk used in the optical disk apparatus has tracks such as prepits, a pregroove or the like formed in a spiral or concentric form. A laser beam irradiates the optical disk rotating at a high speed. In the recording mode, while a low level laser beam tracks the prepits, a high level laser beam selectively irradiates the disk to form data pits in accordance with recording data, thereby recording the data. In the reproducing mode, the data pits are traced by a reproduction laser beam, thereby reproducing the recorded data.

In the optical disk apparatus described above, a laser beam is focused by an objective lens on a track of a narrow width of about 1 $\mu$m which is formed on an optical disk. However, the laser beam must be quickly positioned at the target track for satisfactory tracking. Therefore, tracking control is generally performed. When an optical disk is damaged, when dust attaches to it, when a pregroove is partially absent, or when an external vibration is applied thereon, a tracking error occurs in the tracking control. In other words, the laser beam is deflected from the target track and then "jumps" to another track. When such a tracking jump occurs, data cannot be correctly recorded and reproduced.

SUMMARY OF THE INVENTION

It is an object of the present invention to provide an optical disk apparatus for quickly and steadily detecting a jump direction and the number of jumped tracks when a tracking jump occurs.

According to the present invention, an optical disk apparatus comprises a photosensor for converting laser reflection light reflected from an optical disk to an electric signal, a detector for detecting a signal component corresponding to the jumped track from the electric signal of the photosensor, and a circuit for determining a jump direction and the number of jumped tracks from a signal component of the detector.

According to an optical disk apparatus of the present invention, the optical disk apparatus further comprises means for reforming a laser beam position to an original position before jumping occurred, in correspondence with data corresponding to a tracking jump direction and the number of jumped tracks.

DETAILED DESCRIPTION OF THE PREFERRED EMBODIMENTS

Figure 1:
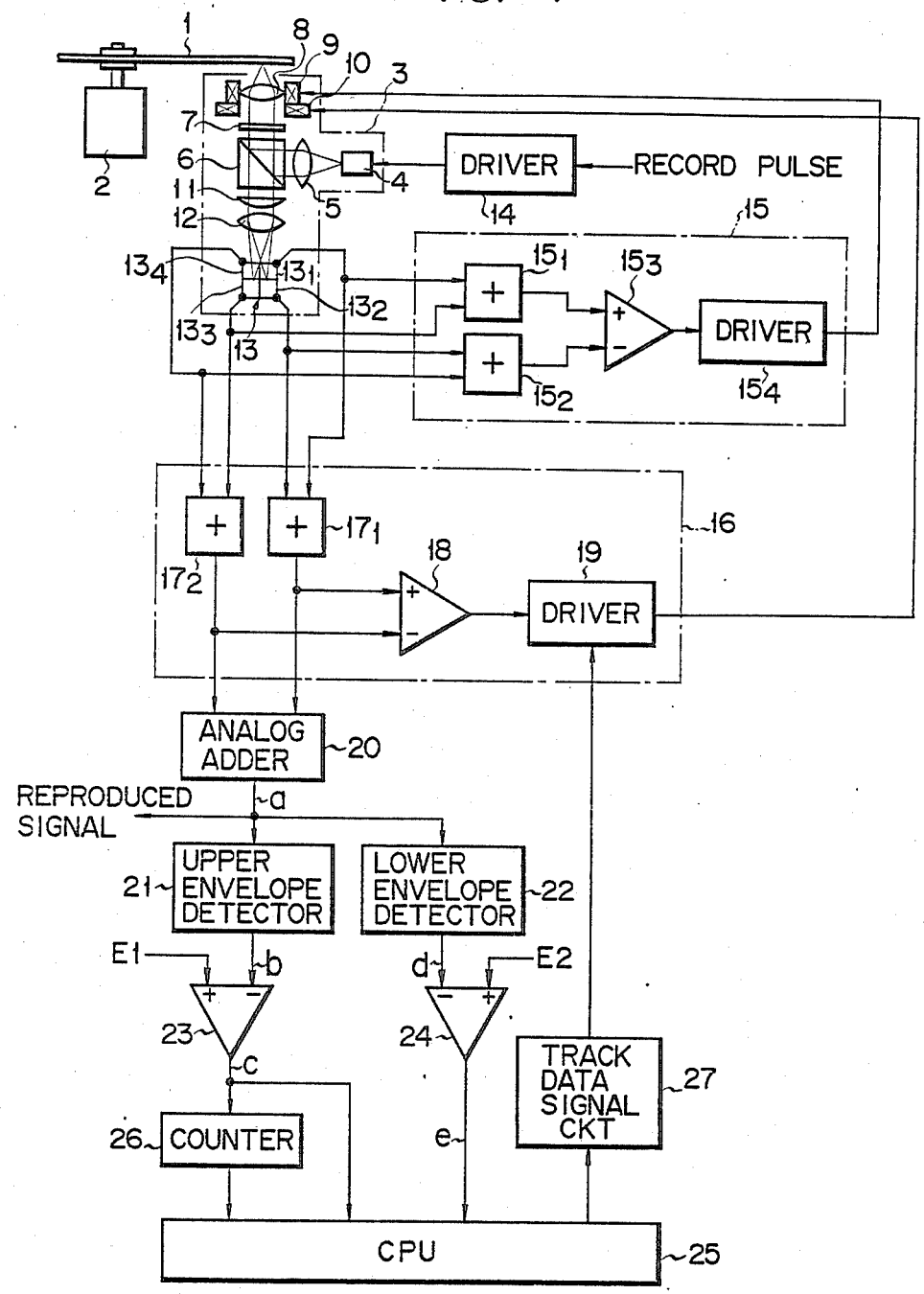
FIG. 1 is a block circuit diagram of an optical disk apparatus according to one embodiment of the present invention.

According to an optical disk apparatus as shown in FIG. 1, an optical disk 1 is coupled to a shaft of a motor 2 to be rotated thereby. An optical head 3 is disposed to oppose the optical disk 1. A semiconductor laser 4 is arranged in the optical head 3, and a collimator lens 5 and a beam splitter 6 are sequentially disposed at an output portion of the semiconductor laser 4. Then, a $\lambda/4$ plate 7 and an objective lens 8 are sequentially disposed to oppose the beam splitter 6 along a direction perpendicular to the light axis or optical axis of the laser 4. The objective lens 8 is movably disposed on a voice coil, i.e., focusing coil 9, and a tracking coil 10 is arranged to be adjacent to the objective lens 8. At the opposite side of the beam splitter 6, a cylindrical lens 11, a condenser or collimator lens 12 and a photosensor 13 are sequentially disposed. The photosensor 13 has four photoelectric segments $13_1$, $13_2$, $13_3$ and $13_4$.

A laser driver 14 has input and output terminals which are connected to a recording data signal supply and the semiconductor laser 4, respectively. A focusing servo circuit 15 has a first adder $15_1$ connected to the photoelectric segments $13_1$ and $13_3$, and a second adder $15_2$ connected to the photoelectric segments $13_2$ and $13_4$. The output terminals of adders $15_1$ and $15_2$ are connected to a comparator $15_3$. The output terminal of the comparator $15_3$ is connected to the focusing coil 9 through a focusing coil driver $15_4$.

A tracking servo circuit 16 has adders $17_1$ and $17_2$. The input terminals of the adder $17_1$ are connected to the photoelectric segments $13_1$ and $13_2$, and the input terminals of the adder $17_2$ are connected to the photoelectric segments $13_3$ and $13_4$. The output terminals of the adder $17_1$ and $17_2$ are respectively connected to noninverting and inverting terminals of a comparator 18 and are also connected to the input terminals of an analog adder 20. The output terminal of the comparator 18 is connected to the tracking coil 10 through a tracking coil driver 19.

The output terminal of the analog adder 20 is connected to the input terminals of upper and lower envelope detectors 21 and 22. The output terminals of the envelope detectors 21 and 22 are respectively connected to the inverting terminals of comparators 23 and 24. Reference voltages E1 and E2 are supplied to the noninverting terminals of the comparators 23 and 24. The output terminal of the comparator 23 is connected to the CPU 25 and to the input terminal of a counter 26. The output terminal of the counter 26 is connected to the CPU 25 and that of the comparator 24 is also connected thereto. Finally, an output port of the CPU 25 is connected to the control input terminal of the tracking coil driver 19 of the tracking servo circuit 16 through a return data signal circuit 27.

The operation of an optical disk apparatus will be described below. The optical disk apparatus can be selectively set in the recording or reproducing mode, and the recording mode will be described first. When a power source and a start switch (both not shown) are sequentially turned on, the motor 2 is driven to rotate the optical disk 1 at a predetermined rotating speed, e.g., 600 rpm. When the semiconductor laser 4 is driven by the laser driver 14, laser light is generated from the laser 4. The laser light is collimated by the collimator lens 5 to be incident on the beam splitter 6. The splitter 6 directs the incident laser light toward the optical disk 1. Then, the laser light is incident on the objective lens 8 through the λ/4 plate 7, thereby being focused at the optical disk 1. The reflected light from the optical disk 1 is incident on the photosensor 13 through the objective lens 8, the λ/4 plate 7, the beam splitter 6, the cylindrical lens 11 and the collimator lens 12. Then, a light spot illuminates at the center of the photosensor 13. Therefore, electric signals corresponding to the intensities of four divided sections of the light spot are generated from the photoelectric segments $13_1$ to $13_4$. The output signals from the photosensor 13 are supplied to the focusing and tracking servo circuits 15 and 16 to perform focusing and tracking control. Accordingly, in the focusing servo circuit 15, the signals from the photoelectric segments $13_1$ and $13_3$ are added by the adder $15_1$, and the signals from the photoelectric segments $13_2$ and $13_4$ are added by the adder $15_2$. Output signals from the adders $15_1$ and $15_2$ are compared by the comparator $15_3$. When a difference between the both signals is detected, a focus error signal corresponding to the difference is supplied to the focusing coil driver $15_4$. The focusing coil driver $15_4$ then supplies a focusing coil current corresponding to the difference to the focusing coil 9. Therefore, the objective lens 8 is axially driven by the focusing coil 9 so as to focus the laser light at a correct focus point.

When the tracking servo circuit 16 performs the tracking control, but no tracking error occurs, that is, when the laser spot is located at the central position of the track, the output signals from the adders $17_1$ and $17_2$ are equal to each other. Therefore, the comparator 18 generates a signal of a predetermined level. Then, the output signal from the comparator 18 is supplied to the tracking coil driver 19 and the driver 19 supplies a constant current to the tracking coil 10 so as to maintain the objective lens 8 at a correct tracking position.

When a tracking error occurs and the laser spot is displaced radially outward from the central position of the track, the output signals from adders $17_1$ and $17_2$ become different from each other. Then, the comparator 18 generates a signal shifted in a positive direction from the level of the correct tracking. Alternatively, when the laser spot is displaced radially inward, the comparator 18 generates a signal shifted in a negative direction from the level of the correct tracking. Such tracking error signals are supplied to the tracking coil driver 19 to supply a drive current corresponding thereto to the tracking coil 10. As a result, the objective lens 8 is moved along a radial direction to locate the laser light beam at the correct track position.

Then, the output signals from the adders $17_1$ and $17_2$ are supplied to the analog adder 20 to be added thereby. In the reproducing mode, an output signal from the analog adder 20 is supplied as a reproduction signal to a signal processing circuit (not shown). The output signal of the adder 20 is also supplied to the upper and lower envelope detectors 21 and 22 to allow monitoring of a track jump.

Figure 2:
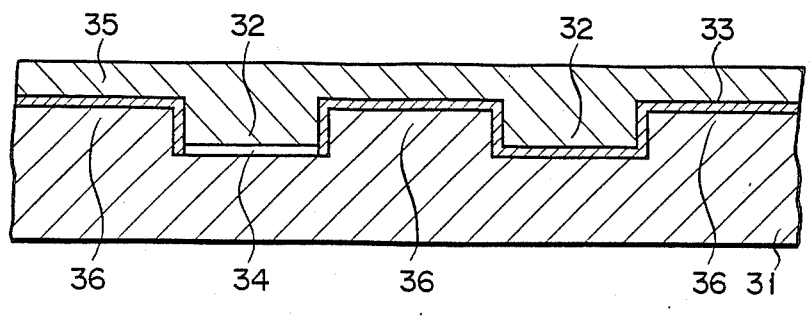
FIG. 2 is a sectional view showing a portion of the optical disk.
Figure 3:
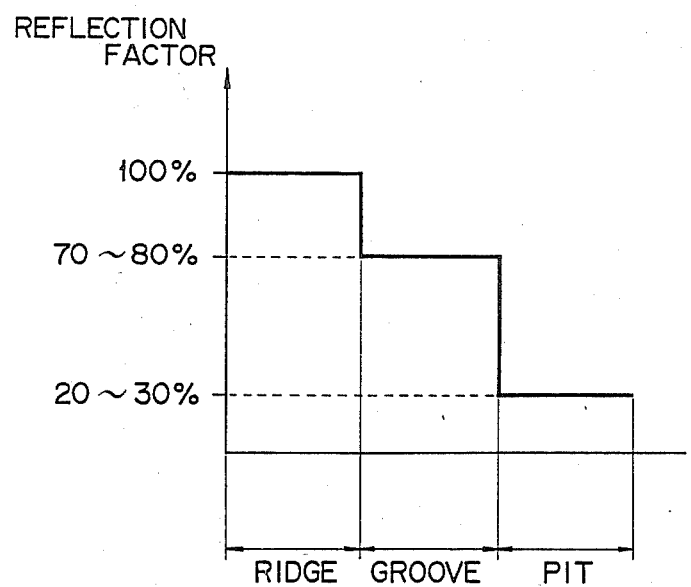
FIG. 3 is a graph showing reflection factors in each portion of the optical disk.
Figure 4:
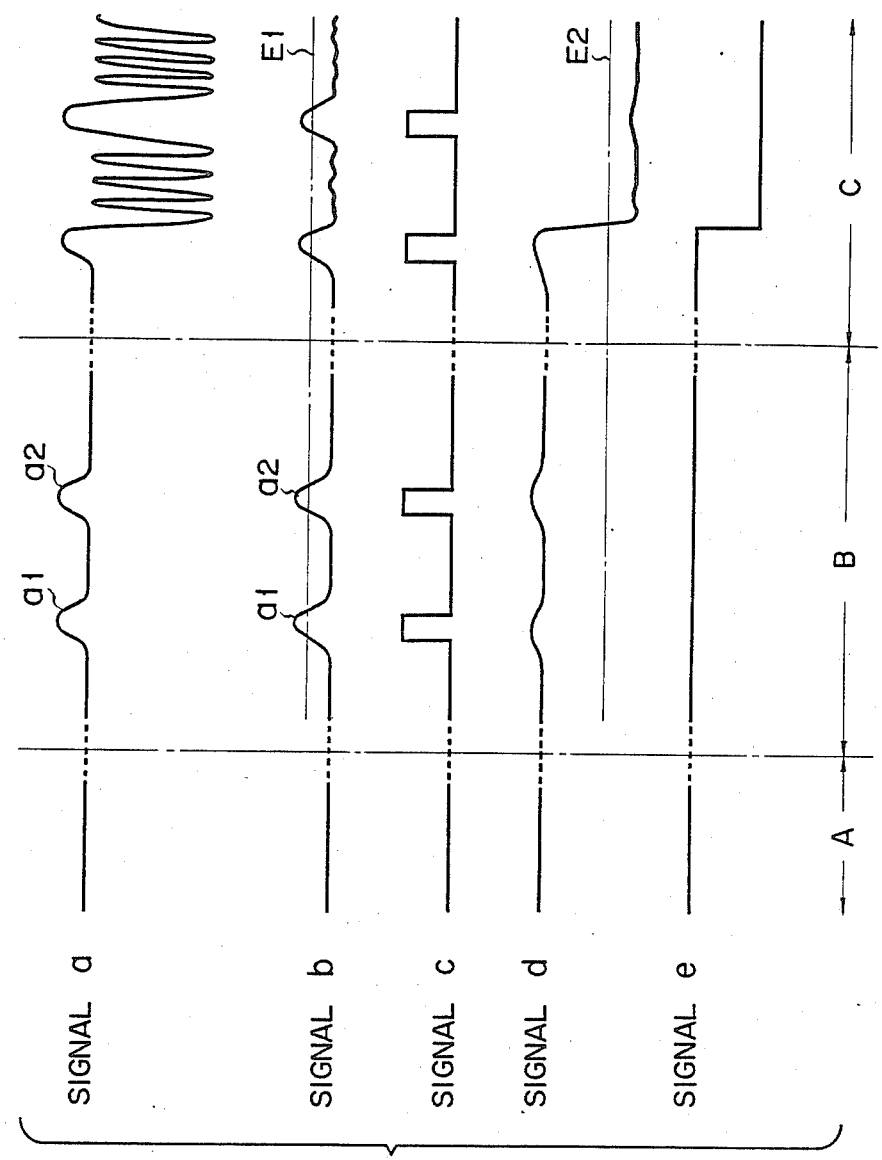
FIG. 4 is a chart showing waveforms of signals in circuit components.

An optical disk of this embodiment will now be described prior to a description of track jump monitoring and detecting. The optical disk 1 comprises a transparent disk substrate 31, track grooves 32, a recording film 33, data pits 34, a protective layer 35 and ridge portions 36, as shown in FIG. 2. When a reproducing level laser beam irradiates this optical disk 1, the laser beam is reflected in the amount corresponding to the differences in the reflection factors of the track groove 32, the recording film 33 of the ridge portion 36 and the data pit 34, as shown in FIG. 3. For example, the recording film 33 of the ridge portion 36 has a reflection factor of 100%, the groove 32 has a reflection factor of 70 to 80% and the data pit 34 has a reflection factor of 20 to 30%. Therefore, in the tracking of the normal recording operation, the reproducing level laser beam traces the track groove and therefore the adder 20 generates a signal a shown in FIG. 4 during an interval A which corresponds to reflected laser light from the groove 32 having a relatively low reflection factor Accordingly, the upper envelope detector 21 generates a signal b shown in FIG. 4. The signal b during the interval A shown in FIG. 4 is supplied to the comparator 23 to be compared with the reference voltage E1. However, since the signal b has a lower level than that of the reference voltage E1, an output signal c of the comparator 23 is at low level. When the low level signal c is supplied to the CPU 25, the CPU 25 determines that the correct tracking is performed and does not change the tracking control. However, when the laser beam deviates from the track by an effect of an external vibration or the like, that is, when a tracking jump occurs, the low level reproduction laser beam crosses the ridge portion 36 having the highest reflection factor. Then, the adder 20 generates the signal a including high level components a1 and a2. Then, this signal is supplied to the comparator 23 through the upper envelope detector 21 so as to be compared with the reference voltage E1. The comparator 23 generates pulses p1 and p2 corresponding to the high level components a1 and a2. The pulses p1 and p2 are supplied to and counted by the counter 26 to calculate the number of jumped tracks. When the pulses p1 and p2 of the comparator 23 are supplied to the CPU 25, the CPU 25 determines that a tracking jump has occurred, and it temporarily interrupts the recording operation. The CPU 25 also determines with reference to the output signal level of the comparator 24 whether the tracking jump has occurred along the outward direction of the optical disk or the inward direction thereof. In other words, if the recording is performed from the inner-most track to the outer-most track and a tracking jump occurs, the laser beam crosses the ridge portion 36 and then locates the track groove 32 in which no data pits are formed. In this case, the adder 20 generates the signal a during the interval B, and the signal a is supplied to the lower envelope detector 22 so as to generate a signal d. The signal d is supplied to the comparator 24 to be compared with the reference voltage E2. Since the signal d has a higher level than that of the reference voltage E2, the comparator 24 generates a high level (i.e., "1" level) signal e. On the other hand, when a tracking jump occurs along the inward direction of the optical disk, the reproduction laser beam crosses the ridge portion 36 to be located at the track groove 32 in which the data pits 34 have already been formed. In this case, the adder 20 generates the signal a in which signal components corresponding to the jumped track groove 32 and signal components corresponding to the data pits 34 alternatively appear, as shown in an interval C of FIG. 4. The signal a is supplied to the lower envelope detector 24 so as to generate an envelope signal of low level of the signal components corresponding to the data pits 34. The low level envelope signal is supplied to the comparator 24 to be compared with the reference voltage E2. Therefore, the comparator 24 generates a low level (i.e., "0" level) signal e. When the output signal e of the comparator 24 is supplied to the CPU 25, the CPU 25 detects whether the signal e is at "1" or "0" level and then determines whether the tracking jump has occurred along the outward or inward direction in correspondence with the detected level.

If the CPU 25 determines the direction of the track jump it produces data relative to the determined direction and the count value of the counter 26. The data is supplied to the return data signal circuit 27. Then, the circuit 27 generates a return data signal, which represents the jump direction and the number of the jumped tracks, in accordance with the data of the CPU 25, and supplies it to the tracking coil driver 19 of the tracking servo circuit 16. The tracking driver 19 supplies to the tracking coil 10 a drive current which has a direction and a value corresponding to the return data signal. The tracking coil 10 is then moved along a radial direction, such that the laser beam is moved for a distance corresponding to the number of the jumped tracks along the return direction opposite to the jump direction. Therefore, the laser beam is returned to the original position. Thereafter, the CPU 25 restarts the recording operation.

In the embodiment described above, the upper envelope of an output signal of the adder 20 is detected and the upper envelope signal is compared with a reference voltage, thereby detecting a tracking jump. However, the present invention is not limited to this embodiment. For example, signal components corresponding to track number prerecorded on a track may be separated from the output signal of the adder 20, and a direction and the number of jumped tracks can be obtained therefrom.

Figure 5:
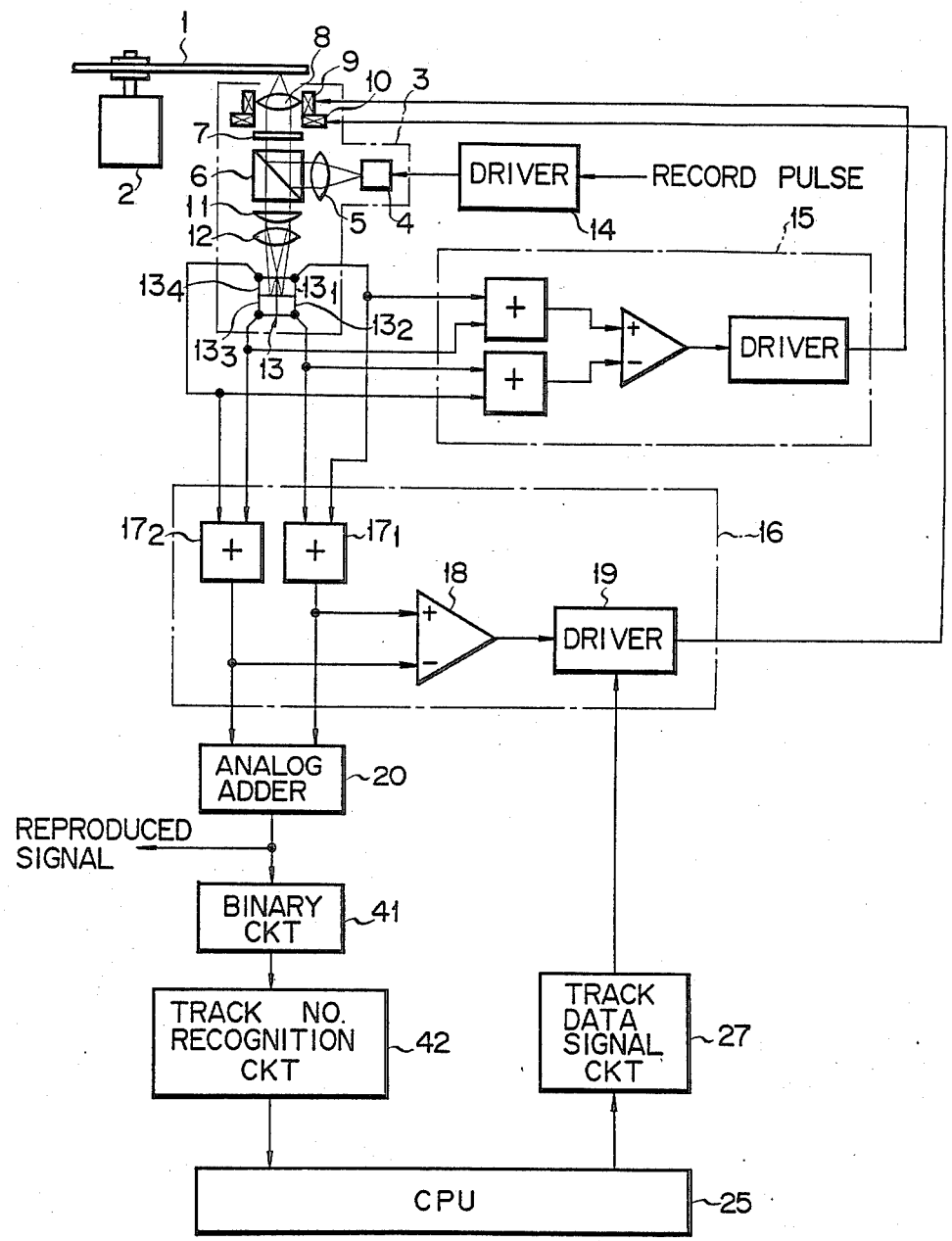
FIG. 5 is a block circuit diagram of an optical disk apparatus according to another embodiment of the present invention.

Another embodiment of the present invention will now be described with reference to FIG. 5. In this case, an output signal of an adder 20 is supplied to a track number recognition circuit 42 through an A/D converter 41. The track number recognition circuit 42 separates data representing a track number from a reproduction signal to determine the track number. Data corresponding to the track number recognized by the circuit 42 is supplied to a CPU 25. The CPU 25 monitors a track number in a state tracing the track with a reproduction laser beam. Then, the CPU 25 identifies the current track number with the track number recognized by the track number recognition circuit 42. In this case, when coincidence between the two track numbers cannot be detected, the CPU 25 determines that a tracking jump has occurred. In this case, the CPU 25 compares the track number to be tracked with the track number recognized by the track number recognition circuit 42. In accordance with the above comparison result, the CPU 25 determines whether an outward or inward jump has occurred. Then, the CPU 25 calculates the number of jumped tracks from the two track numbers. The CPU 25 supplies data relative to the direction and number of jumped tracks to a return data signal circuit 27 in correspondence with the comparison signal. Therefore, a laser beam is returned to a correct track before jumping.

According to the present invention, in the data recording and reproducing modes, when the tracking jump occurs, a jump direction and the number of jumped tracks can be quickly and steadily detected. Furthermore, when the laser beam jumps, it can be quickly and automatically returned to an original position.

What is claimed is:

1. An optical disk apparatus comprising:

an optical head including means for emitting a light beam to an optical disk having a number of track grooves in a radial direction thereof and a photosensor for converting light reflected from said disk into an electric signal;

track jump data detecting means for detecting a track jump data component from said electric signal, the track jump data component corresponding to an accidental track jump of at least one track groove in the radial direction from a correct track groove;

jump extent detecting means for determining a number of tracks jumped and a jump direction from the track jump data component detected by said track jump data detecting means to produce a return signal corresponding to the number of tracks jumped and the jump directions; and tracking means, responsive to said return signal, for returning the laser beam to the track which was correct before jumping.

2. An optical disk apparatus according to claim 1, wherein said emitting means includes laser means for generating a laser beam, an optical system for shifting the laser beam to the track of the optical disk, and optical system drive means for driving said optical system for focusing and tracking; and said tracking means recevies a signal corresponding to the track jump direction and the jump track number determined by said jump extent detecting means so as to drive said optical system for correcting the track jump.

3. An optical disk apparatus according to claim 1, wherein said track jump data detecting means comprises envelope detector means for producing an envelope signal corresponding to an envelope of said electric signal and said jump extent detecting means comprises comparator means for comparing said envelope signal with a reference signal, and means for determining the track jump from a signal level of an output signal generated from said comparator means.

4. An optical disk apparatus according to claim 1, wherein said jump extent detecting means includes count means for counting the track jump data component in an output signal from said track jump data detecting means, and for generating a count value as the jump track number.

5. An optical disk apparatus comprising:

an optical head including means for emitting a light beam to an optical disk having a number of tracks in a radial direction thereof, each of said tracks recording a track number data representing a track number, and a photosensor for converting light reflected from said disk into an electric signal;

means for detecting a track number data from said electric signal, said track number data being recorded on a track to which a jump has accidentally occurred from a correct track;

jump extent detecting means for determining a number tracks jumped and a jump direction room the track number data detected by said detecting means to produce a return signal corresponding to the number of tracks jumped and the jump direction; and tracking means, responsive to said return signal, for returning the laser beam to the track which was correct before jumping.

6. An optical disk apparatus according to claim 5, wherein said jump extent detecting means includes means for calculating the number of tracks jumped from a difference between the track numbers recognized before and after the track jump.

* * * * *